United States Patent [19]
Schumm

[11] 4,006,732
[45] Feb. 8, 1977

[54] ICE FISHING HEATER

[76] Inventor: Donald W. Schumm, P.O. Box 246, Leo, Ind. 46765

[22] Filed: Mar. 31, 1975

[21] Appl. No.: 563,582

[52] U.S. Cl. .......................... 126/271.1; 126/360 R; 432/225; 61/36 A

[51] Int. Cl.² .......................................... F23C 5/24

[58] Field of Search ................ 126/271.1, 271.2 R, 126/271.2 C, 271.3, 360 R, 360 A, 367, 368; 432/225, 224, 232; 219/317–319; 61/36 A

[56] References Cited
UNITED STATES PATENTS

| 314,388 | 3/1885 | Mansfield | 432/225 |
| 404,572 | 6/1889 | Spiro | 126/367 |
| 802,876 | 10/1905 | O'Connor et al. | 432/232 |
| 1,515,112 | 11/1924 | Hisey | 432/232 |
| 2,541,328 | 2/1951 | Boklep | 126/360 |
| 2,990,829 | 7/1961 | McDonough et al. | 126/271.2 R |

*Primary Examiner*—John J. Camby
*Assistant Examiner*—Henry C. Yuen

[57] ABSTRACT

The invention involves providing a device adapted for use in relation to a hole in a layer of ice for maintaining the hole free of ice whereby to facilitate the art of fishing therethrough.

13 Claims, 8 Drawing Figures

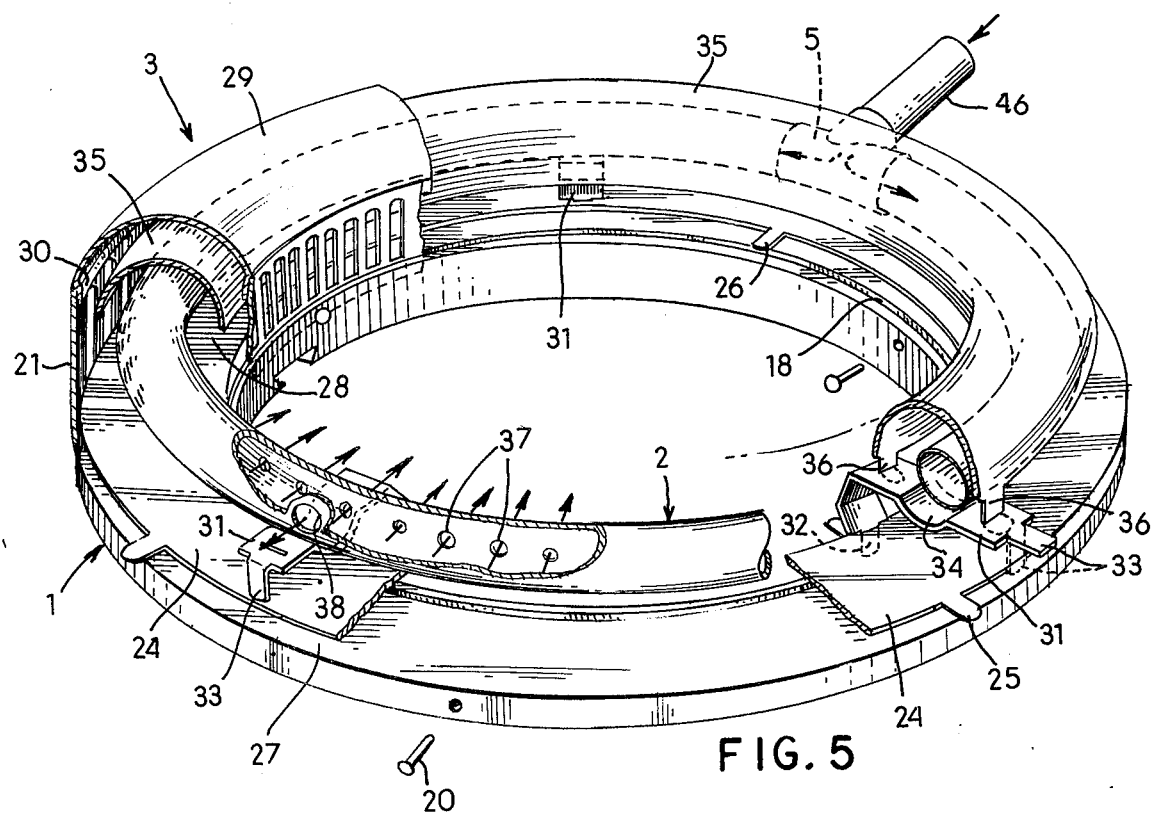
FIG. 5
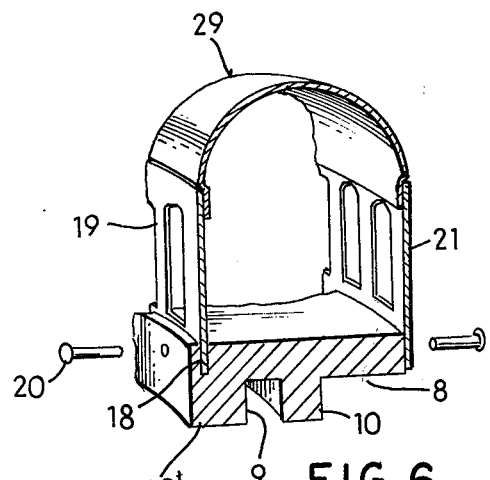
FIG. 6
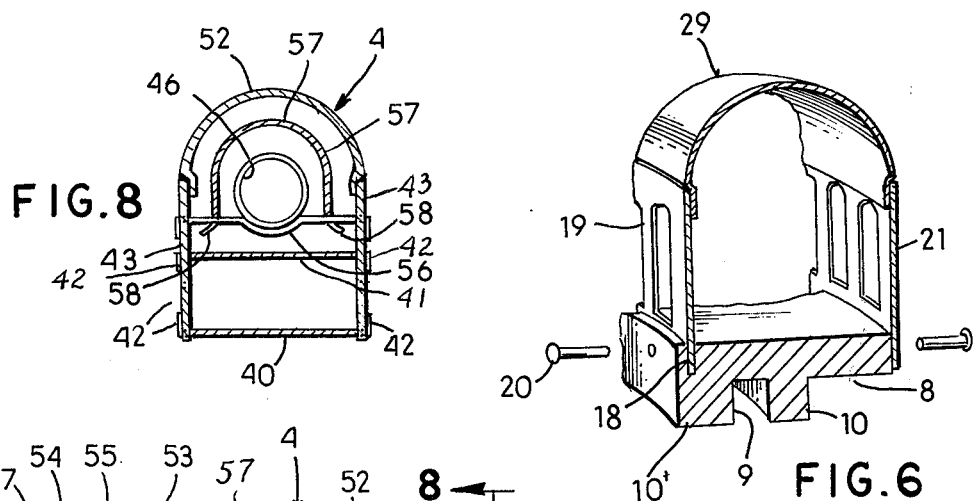
FIG. 8
FIG. 7

ICE FISHING HEATER

BACKGROUND

Various devices or equipment have heretofore been employed in an attempt to maintain fishing holes free of icing but insofar as known none are presently available for purchase.

A number of Patents have been issued directed to different devices for the above purpose, such as for example, Patents respectively issued to Lewis L. Rydeen, U.S. Pat. No. 3,204,630 dated Sept. 7, 1965, and Henry O. Boklep, No. 2,541,328 issued Feb. 13, 1951, which among other things, disclose tubular hollow walled structures which are located substantially within the confines of a hole in a layer of ice and an appreciable distance therebelow, with gas connections for introducing gas or locating oil heaters in the wall structure.

Another Patent issued to Lloyd O. Paulsen et al, U.S. Pat. No. 2,774,856 on Dec. 18, 1956 shows an annular tubular floatable member containing an electrical heating element.

Also, a Patent issued to Arman W. Holm et al, U.S. Pat. No. 2,747,569 on May 29, 1956 depicts, among other things, a generally crescent shaped receptacle, containing combustible material, which is adapted for placement on a layer of ice with a flange of the receptacle depending into a hole for heating the water when the receptacle is sufficiently hot to transmit heat to the flange.

Further, a Patent issued to Russell E. Obernolte U.S. Pat. No. 2,883,784 dated Apr. 28, 1959 discloses, among other things, a combination of a hollow dome adapted for mounting on a layer of ice over a hole and a buoyant cup candle holder located in an enlarged area of the hole adjacent an inner periphery of the dome.

An additional Patent No. 3,407,283 issued to Harry L. Peterson on Oct. 22, 1968 discloses a bouyant hollow cylinder dependent in one side of an ice hole for receiving heat from a gas burner or electrical element.

The Patents, above referred to, clearly indicate that attempts have been made to maintain fishing holes clear of ice but the foregoing and others directed to the subject appear to be impractical, condusive to probable line entanglement or burning thereof, expensive to manufacture and maintain, and unstable due to their buoyancy and shifting as a result of melting the ice about the hole.

OBJECTIVES

With the foregoing in mind, one of the important objects of the subject invention is to provide a device which offers advantages over the devices alluded to above.

More particularly, the device is adapted for support on ice above or over a hole, and comprises, among other things, an annular base, an annular heater, means for supporting the burner in spaced relation to the base, and a housing or casing for covering and protecting the burner and base and a fisherman using the device.

Another object of the invention is to provide a device of the character described in the preceding paragraph in which the heater is preferably heated by gas from a small portable gas cartridge or tank and provided with a fitting or receptacle for readily detachably accommodating a burner attached to the tank and in which the heater is provided with a plurality of circumferentially spaced openings or ports for emitting heat therefrom, and wherein the housing has inner grille work or circumferentially spaced vents or openings through which the heat from the ports flows generally inwardly toward the center of the device. The housing is also provided with outer grille work or circumferentially spaced openings or inlets through which air may enter whereby to assist in the circulation of the heated air and also maintain the housing in a cool state or condition to promote safety.

A significant objective is to provide a unique organization whereby the base is maintained in a cool state or condition by means of an annular member or partition which is located between the heater and base at a predetermined elevation or distance to provide what may be a termed, a lower annular chamber through which cool air may freely circulate through the openings provided in the housing as above referred to.

Another object is to provide a device in which the supporting means for the heater preferably comprises a plurality of circumferentially spaced brackets which are jointly connected to the partition and housing and are provided with concave seats for the heater which is tubular and round in cross-section.

A particularly significant object is to provide a device in which the partition and housing or what may be termed an upper annular chamber within which the heater is concentrically arranged.

A specific object is to provide a device which preferably includes an upper annular shield of semi-circular cross-section which is located in the upper chamber and interposed between and in spaced relation to the heater and housing whereby to assist in circulating the heated air away from the top of its housing in order to maintain the housing in a cool condition and thereby promote safety.

Other specific objects are to provide a device in which the base thereof is provided with adjustable means whereby to assist in locating and holding the device in an ice hole of variable diameter and the base is designed and constructed to dissipate heat therefrom.

Additional objects and advantages of the invention reside in providing a device which has proven to be reliable, efficient, safe and easy to operate and use, durable, and comprised of a minimum number of components which can be manufactured and assembled on a production basis.

Additional objects and advantages or attributes of the invention will become apparent after the description hereinafter set forth is considered in conjunction with the drawings annexed hereto.

DRAWINGS

In the drawings:

FIG. 5 is a partial perspective view of the device, with portions broken away whereby to illustrate details of its construction;

FIG. 6 is a partial perspective view depicting details with respect to the structure of the base and housing;

FIG. 7 is a vertical section taken substantially on line 7—7 of FIG. 1; and

FIG. 8 is a transverse section taken substantially on line 8—8 of FIG. 7.

DESCRIPTION

Figure 1:
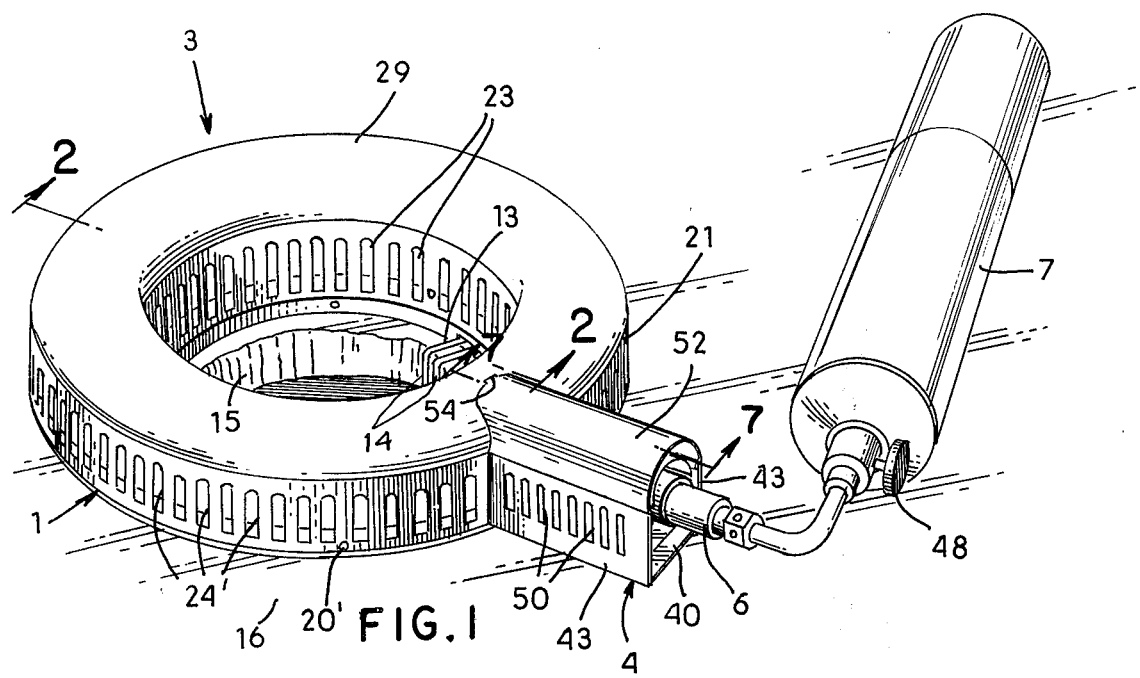
FIG. 1 is a perspective view of an operative device embodying the invention.
Figure 2:
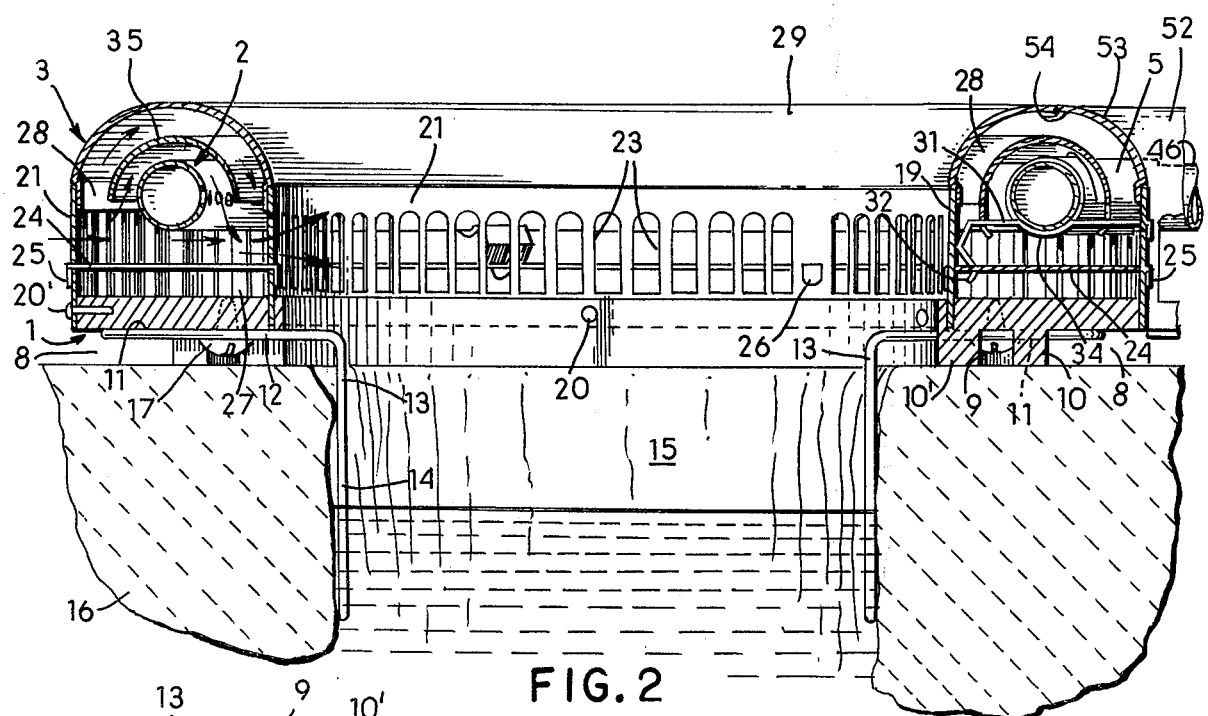
FIG. 2 is an enlarged vertical section taken substantially on line 2—2 of FIG. 1.
Figure 3:
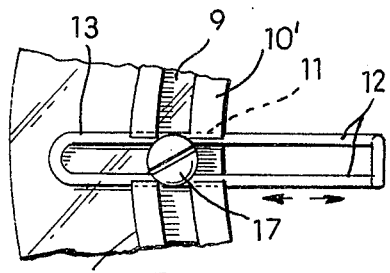
FIG. 3 is a partial bottom view of the device showing one of a pair adjustable or locating means.
Figure 4:
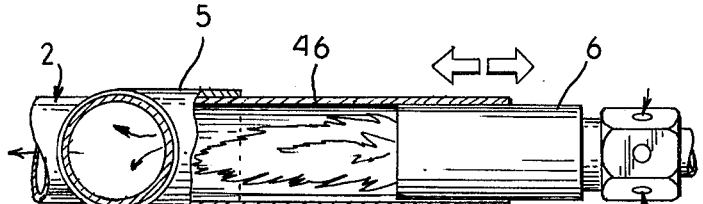
FIG. 4 is a partial longitudinal section taken through the inlet means or receptacle for a burner.

Referring to the drawings there is disclosed a device comprising, among other things, a base generally designated 1, a heater generally designated 2, a housing generally designated 3 in which the base and heater are substantially confined. This device also preferably includes a radial or offset structure generally designated 4 in which a fitting or connection means 5 is disposed for operatively receiving a conventional burner 6 provided on a pipe extending from a relatively small tank or cartridge 7 containing gas.

The base 1 may be designed and constructed in various ways and made of any material suitable for the purpose but is preferably annular in shape and made of cast aluminum. The underside of the base is preferably provided with a relatively large outer rabbet 8, an annular groove 9, forming an intervening rib 10 and an inner larger rib 10' and two radial slots 11 which are preferably of a dove-tailed character whereby each will accommodate a pair of resiliently flexible portions 12 which constitute an upper horizontal leg of an angled locating, positioning and/or holding means 13. Each of the locating means also includes a pair of resiliently flexible portions 14 constituting a depending leg. These locating means, due to their structure, and the dove-tailed slots afford a unique setup whereby the upper legs may be selectively manipulated and automatically held in any one of an infinite number of positions in the slots after adjustment so that the depending legs may be correctly disposed in relation to the periphery of a hole 15 in a layer of ice 16 for holding the device in a stable more or less center position over or above the hole. If so desired screws 17 may be extended between the portions 12 of the upper legs of the locating means for locking the latter in position. It should be noted that the ribs 10 and 10' have diameters greater than the diameter of the hole 15 and rest upon the ice and that the rabbet 8, among other things, afford clearance for manipulation of the upper legs of the locating means. Obviously, more than two locating means may be employed.

The upper side of the base 1 is preferably provided with an annular groove 18 which is adapted to receive a lower marginal edge portion of an inner annular vertical wall 19 constituting a component of the housing 3. This wall is preferably held in the groove 18 by fastening means 20, such as rivets, which extend into holes provided therefor in the wall and in the base as shown.

The housing 3, also preferably includes an outer annular vertical wall 21 having a lower portion which is preferably secured to an outer edge portion of the base 1 by fastening means 20', such as rivets, which extend into holes provided therefor in said portion for securing the wall 21 in a fixed concentric relation to the inner wall 19 to provide an annular space therebetween.

The inner wall 19 is preferably provided with grille work or circumferentially spaced corresponding relatively narrow vertical openings or slots 23 which constitute outlets or ports through which heat flows generally toward the center of the device and the outer wall 21 is preferably provided with grille work or circumferentially spaced corresponding relatively narrow openings or slots 24' which constitute inlets or passages through which air from the atmosphere may freely enter the housing and assist in circulating the heat in the housing and out through the openings or ports formed by the slots 23 as well as assist in maintaining the device in a cool state or condition as will be subsequently described.

The device is also preferably constructed to include what may be termed an annular horizontal partition 24 which has outer lugs 25 which extend through apertures provided therefor in the outer wall 21 and with inner means 26 which extend into the inner wall 19, all for the purpose of securing the partition in place and to provide a lower annular chamber 27 which is communicatively connected to the atmosphere through the lower ends of the slots 23 and 24' and also provide an upper larger annular chamber 28 which is also communicatively connected to the atmosphere through upper ends of the aforesaid slots. The housing 3 also preferably includes an annular cover 29 preferably concavo-convex in cross-section which more or less forms a curved or arched roof which has lower offset portions 30 which snugly receive upper portions of the side walls 19 and 21. This cover 29, side walls 19 and 21, and the partition 24 define the upper or larger chamber 28. It may be stated that the base, side walls and cover provide an annular hollow housing or casing within which the heater is disposed. It may also be stated that the partition 24 constitutes means which assists in preventing the heat from the heater from being transmitted to the base 1.

The heater 2 is constructed of a suitable metal and may be supported in various ways but is preferably mounted substantially in a concentric center position in the housing 3 or upper chamber 28 by radial brackets 31, each of which has an inner downturned articulated leg provided with an offset end 32 which extends through a hole provided therefor in the partition 24 and with an outer lug 33 which extends through a hole provided therefor in the outer wall 21 and is upset as shown for locking each bracket in a substantially horizontal position and so that a concave seat 34 in each bracket serves to receive and assist in holding the heater in position.

The device also preferably includes an annular metal shield or member 35 of concavo-convex cross-section which overlies and receives the heater and is spaced therefrom, including the cover and side walls of the housing. This shield is secured over the heater and to the brackets 31 by providing lower edge portions of the shield with lugs 36 which extend through holes provided therefor in the brackets and are upset for locking purposes as shown. It may be stated that this shield constitutes a means whereby to assist in preventing the heat from the heater from being transmitted to the cover and thereby protects the hands of a fisherman or operator from being burned when the cover is accidentally contacted. Otherwise expressed, this shield and the partition 24 and other structures assist in maintaining the housing structures in a cool condition to protect an operator as well as prevent accidental burning of a line.

The heater 2 is provided with a partial inner ring or arcuate arrangement of circumferentially spaced ports or orifices 37 which face inwardly of the heater and so that heat may flow inward through the inner slots 23 at least generally toward the center of the device as indicated by the arrows. The heater is also provided with a relatively larger outer vent or opening 38 located generally midway of and opposite the ports 37 which may assist in the initial starting of the operations of the burner and flow of heat into the heater.

The radial structure 4, above referred to, and depicted in FIGS. 1, 7 and 8, preferably comprises a relatively narrow rectangular and thin bottom planar metal member 40 and a partition or member 41 similar to the partition 24. These members have spaced side lugs 42 which extend through holes provided therefor in parallel side walls 43 constituting components of the structure. A projecting portion 44 of the partition member 41 extends through an opening provided therefor in the outer wall 21 of the housing and bears upon the upper surface of the partition 24 as shown in FIG. 7. The bottom member 40 has an extended portion 45 which engages an under surface of the rabbet 8 and a fastener in the form of a clip 46 is secured in the rabbet and serves to engage and hold the extended portion to the base 1.

The fitting or connection means 5, alluded to above, is preferably in the form of a tubular T in which generally outwardly extending ends thereof are secured in or about spaced ends of the heater 2 with a tubular stem 46 of the T extending radially outwardly through an opening 47 provided therefor in the outer wall 21 of the housing for readily detachably receiving the burner 6, the latter of which is connected to the tank by a tube in a conventional manner. The tank is provided with a valve 48 for controlling the flow of the gas flame into the T and heater 2.

The pair of parallel side walls 43 of the subassembly 4 are respectively provided with longitudinally spaced vertical slots or openings 50, similar to the slots 23 and 24' above described. A cover 52 preferably concavo-convex in cross-section has lower edges which are fitted in offsets of the upper portions of the side walls 43 in a manner corresponding to the way the annular cover 29 is secured to the side walls 19 and 21. An inner portion 53 of the cover 52 is cut away whereby to conform or merge it with the annular cover 29 and a lug 54 on the portion 53 extends through an opening 55 in the cover 29 and is upset to assist in securing the cover in place. If found desirable, the cover 52 and side walls 43 may be of a one-piece construction. It may be stated that this radial structure constitutes a secondary hollow housing and that means are disposed therein whereby to operatively connect the heater with a source of energy.

A bracket 56 is secured to and bridges the side walls 43 and provided with a concave seat for supporting the stem 46 of the T fitting 5. A relatively short concavo-convex metal shield 57 is disposed above and about the stem 46 and has lugs 58 which extend through holes provided therefor in the bracket 56 and are upset. It may be said that the partition 41 and shield 57 constitute means which serve to substantially prevent or minimize transfer of heat from the heater to the bottom member 40 and cover 52 for protective purposes as set forth above with respect to the annular housing structure.

SUMMARY

In view of the foregoing it will be manifest that the device is of a size, shape, and construction which is convenient to install and safe to operate. More particularly, the device can be readily mounted and positioned substantially on the upper surface of a layer of ice, as distinguished from some of the other devices disclosed in the Patents, above referred to, which either depend an appreciable distance in a hole and are provided with heating means below a layer of ice or some which comprise a floatable heating ring. The structure disclosed in the subject application is so designed and constructed that it is insulated from the ice and will not melt or receded therein and the portable tank of gas can be readily detachably connected to the heater and is controllable for regulating the heat for a period of use between one and thirty hours of normal use, depending, of course, on weather conditions and/or the size of the tank. It may be stated that the tank may also serve as a weight whereby to assist in holding the device in place.

Having thus described my invention, it is obvious that various modifications may be made in the same without departing from the spirit of the invention and therefore, I do not wish to be understood as limiting myself to the exact forms, constructions, arrangements, and combinations of components herein shown and described.

I claim:

1. A device for preventing water in a hole in a layer of ice from freezing, said device comprising an annular base for disposition on ice above and about a hole and forming an opening, an annular tubular heater means forming an unobstructed opening, means for supporting the heater means above and in spaced relation to said base for locating said unobstructed opening above said base opening, said heater means being provided with at least one inner outlet port through which heat may be caused to emanate generally toward the center of said device when connected to means for supplying heat, and an annular housing arranged above and about said heater means and base for confinement of at least a portion of the latter therein.

2. A device for preventing water in an ice hole from freezing, said device being adapted for support and disposition on ice above and in a surrounding relation to a hole and comprising an annular base forming a center opening, an annular housing connected to said base and forming in combination therewith an annular chamber, said housing being provided with inner grille work, an annular tubular heater provided with ports and substantially surrounding said opening and supported in said chamber in spaced relation to said base and housing, and means whereby the heater may be readily operatively connected to a supply of energy, and said means is constructed to distribute heat in opposite directions in said heater and through said ports for flow generally toward the center of the device via said grille work.

3. A device for preventing water in an ice hole from freezing, said device being adapted for support and disposition on ice and in a surrounding relation to a hole and comprising an annular base forming a center opening, an annular housing connected to said base and forming in combination therewith an annular chamber, an annular heater substantially surrounding said opening and supported in said chamber in spaced relation to said base and housing, an annular partition disposed in said chamber between and in spaced relation to said heater and base whereby to provide a lower chamber, said housing being provided with openings through which air may freely circulate in and out of said lower chamber whereby to assist in insulating said heater from said base, and means whereby the heater may be readily operatively connected to a supply of energy.

4. The device defined in claim 3, in which the annular partition is supported in said chamber to divide the latter into upper and lower chambers, said heater is located in said upper chamber, and said housing has walls provided with opening which communicate with said chambers and the atmosphere.

5. A device comprising an annular base, said base being adapted for disposition on ice above a hole therein and forming an unobstructed opening, an annular housing carried by said base and having an inner wall provided with grille work, an annular partition disposed in said housing and dividing the interior of the latter into an upper chamber and a lower chamber, said chambers being open to the atmosphere, annular tubular heater means forming an unobstructed opening, means for supporting said heater means in said upper chamber above said lower chamber and locating said unobstructed opening above said base opening, and said heater means being provided with at least one inner outlet port through which heat may be caused to emanate for circulation through said grille work and generally toward the center of the device when connected to means for supplying heat.

6. The structure defined in claim 5, including a shield disposed in said upper chamber in a position above an installed heater whereby to assist in preventing an upper portion of the housing from becoming too hot to handle.

7. A device for preventing water in a hole in a layer of ice from freezing, said device comprising an annular base for disposition on ice above and about a hole and forming an opening, an annular tubular heater means forming an unobstructed opening, means for supporting said heater means above and in spaced relation to said base for locating said unobstructed opening above said base opening, and said heater means being provided with at least one inner outlet port through which heat may be caused to emanate generally toward the center of the device when connected to means for supplying heat.

8. A device for preventing water in an ice hole from freezing, said device comprising a hollow annular structure adapted for support on ice above and in a surrounding relation to a hole therein and having a base forming an opening, an annular tubular heater means forming an unobstructed opening, means for supporting said annular heater means within the confines of said structure to substantially locate its unobstructed opening above said base opening, said structure having an inner wall provided with inner openings open to the atmosphere, and said heater means being provided with inner outlet ports through which heat from the heater means when connected to a source of energy may be caused to flow and radiate through said inner openings generally toward the center of the device.

9. A device for preventing water in an ice hole from freezing, said device being adapted for support on ice above and in a surrounding relation to a hole and comprising an annular base for disposition on ice and forming an opening, an annular heater supported above said base in a surrounding relation to said opening and provided with means whereby heat may be caused to flow through the heater and around said opening, means interposed between said heater and base whereby to substantially prevent heating of the latter, and a plurality of locating means of which each comprises an upper leg adjustably secured to said base and a depending leg for disposition in a hole for stabilizing and holding the device in correct relation to a hole.

10. A substantially annular device for disposition upon a layer of ice above and in a surrounding relation to a hole therein, said device comprising an annular base provided with means for adjusting the device in relation to such a hole and forming an opening, a pair of annular walls having lower edges secured to said base for locating said walls in an upstanding concentric spaced relation, an annular cover disposed over and secured to said walls to provide an annular substantially hollow housing, an annular heater supported in said housing in a surrounding relation to said opening and in concentrically spaced relation to said walls, and said housing being provided with a plurality of circumferentially spaced openings through which heat from the heater may flow toward the center of the device.

11. The device defined in claim 10, including a tank of fuel operatively connected to said heater at a location externally of said opening whereby to assist in holding the device in place on ice.

12. The device defined in claim 10, in which said heater is provided with ports for directing heat therefrom generally toward said openings.

13. The device defined in claim 10, including means for insulating said base and said cover.

* * * * *